Patented Mar. 14, 1950

2,500,331

UNITED STATES PATENT OFFICE 2,500,331

PROCESS OF APPLYING PROMOTERS TO CATALYST PARTICLES

Vanderveer Voorhees, Homewood, Ill., assignor to Standard Oil Company, Chicago, Ill., a corporation of Indiana No Drawing. Application December 5, 1947, Serial No. 790,011

4 Claims. (Cl. 252—473)

This invention is related to the preparation of a catalyst, and more particularly pertains to a catalyst suitable for use in the conversion of carbon monoxide and hydrogen into hydrocarbons and oxygenated compounds. Specifically, the invention relates to the preparation of a finely divided iron catalyst activated by added promoters and adapted for contacting gasiform fluids in a dense turbulent suspended phase.

The use of iron-alkali metal catalyst for the conversion of hydrocarbons has long been known to the art. However, attempts to apply the fluidized solids technique to the synthesis of hydrocarbons using this iron-alkali metal catalyst have encountered unexpected problems in catalyst activity control. For example, the loss of the more finely divided particles has resulted in an unexpected reduction in activity of the remaining catalyst beyond that which might be attributed to surface effects or weight of catalyst lost.

Operating conditions and techniques have been developed whereby the catalyst can be retained in the fluidized condition during the synthesis operation for relatively long periods of time. It has been found that proper fluidization requires a distribution of catalyst particle sizes over a considerable range, usually from about 20 to 300 microns diameter.

During operation, the proportion of finer particles tends to increase as a result of disintegration. Catalyst disintegration can occur by reason of build-up of carbon on the catalyst and recently it has been observed that disintegration occurs even in the absence of carbon build-up. Furthermore, it has been found that the catalyst fines have been much more active than the catalyst particles of larger size and that it is very difficult to keep the active fines in the dense phase. The tendency of the fines to be carried away by the gas stream results in an equilibrium catalyst in which most of the particles are disintegrated coarser particles originally charged. Thus, the larger particles are the ones which remain within the fluid system. From the standpoint of uniform catalyst performance, therefore, it is desirable, in some manner, to render the large particles of catalyst as active as the smaller ones. It is, therefore, an object of this invention to provide a method and means for preparing catalysts of substantially uniform activity. Another object of the invention is to provide a method and means for promoting a finely divided iron catalyst to give a catalyst of good fluidization characteristics, i. e. comprising a mixture of fines and larger particles while at the same time producing a catalyst of substantially uniform activity and uniform performance in use. It is a specific object of my invention to provide a promoted iron catalyst for synthesis of hydrocarbons from CO and $H_2$ which is uniformly promoted throughout all ranges of particle size, as it has been found that an optimum concentration of promoter exists for the synthesis of hydrocarbons in the desired molecular weight range.

The presence of fines in the dense turbulent suspended phase is esssential for ease of fluidization. Thus it is highly desirable that the finely divided catalyst as charged to the reactor include a certain proportion of relatively large, intermediate, and relatively fine particles. However, when a mixture of catalyst particles of varied size is treated with an aqueous solution of an alkali metal as has been the practice heretofore, the quantity of promoter on any one particle is proportional to the surface area of that particle. Accordingly, the amount of promoter deposited on each particle is proportional to its surface area and not in proportion to its weight or volume. The promoter, on heating, has a tendency to migrate within the catalyst particle during activation at elevated temperature and during use in synthesis. Accordingly, the amount of promoter on the surface of a given particle is decreased by such migration. When the quantity of promoter on a given particle is proportional the surface area and not to the mass of the particle, then after the migration has occurred, the concentration of promoter is substantially greater in the particles of smaller mass. It is an object of this invention to provide a method and means whereby each particle of synthesis catalyst contains a uniform proportion of promoter throughout each particle, regardless of particle size.

In general, I attain the objects of my invention by grading the raw catalyst into a plurality of different fractions or grades of relatively uniform particle sizes and applying the promoter to the different sizes separately, in optimum amount for each size. Thus, when employing a promoter salt in solution, the impregnating or promoting solution is chosen of a strength to be optimum for each particle size. This treated catalyst can then be activated by contacting with a reducing gas, for example at 700 to 900° F., or supplied directly to the synthesis reactor.

By conventional promoting techniques, uneven distribution of the promotor results because of the difference in particle size of the finely divided iron oxide. The larger particles, having relatively less surface, will receive relatively less promoter. Assuming non-porous catalyst and that the film thickness of the promoter solution will be the same on the surface of all particles, then a particle ten times as large as another will receive only one-tenth the quantity of promoter, and in general, the concentration of promoter deposit will vary inversely with the diameter or thickness of the particles. Experience has shown that the fines which are preferentially lost from the reactor have a higher concentration of promoter than the catalyst left behind, the loss of fines being accompanied by decreased catalyst activity.

The following data, obtained by analysis, will show how the concentration of promoter varied with catalyst particle size in the case of a catalyst made from roasted pyrites which was ground to a powder and then impregnated with a potassium salt solution, dried and ignited. Analyses were made after screening to the sizes indicated.

| Particle Size, Microns | Average Particle Size Estimated, Microns | Concentration of Promoter, Wt. Per Cent K |
| --- | --- | --- |
| 0-44 | 22 | 0.945 |
| 53-74 | 64 | 0.586 |
| 99-144 | 122 | 0.485 |

This maldistribution of promoter can be corrected by grading the catalyst before adding the promoter and subsequently using a more concentrated promoter solution on the coarser material as indicated hereinabove or by repeated application of promoter to the coarser particles. In some instances it is only necessary to grade catalyst into two or three sizes, for example fine, intermediate and coarse. After applying the promoter solution to the different grades of catalyst so that each size receives the optimum quantity of promoter proportional to the mass of the particle, the batches of catalyst can be separately dried and igniated before remixing to obtain the optimum particle size distribution. By this separate drying and igniting, the promoter is affixed to the surface of the particles and permitted to migrate into the particles, preventing redistribution of the promoter between the individual particles.

In the case of dense oxides, such as mill scale, a very little of the promoter solution is actually absorbed into the oxide particle before the catalyst drying step. Migration of the solid promoter will have a tendency to occur during the catalyst reduction step and during synthesis.

The hydrocarbon synthesis process with which this invention is concerned, employs an iron catalyst and is conducted at a temperature of between about 400 and 750° F. and at pressures of between about 75 and 600 pounds per square inch. A preferred range of temperature is between 450 and 675° F. and a pressure of between about 175 and about 325 pounds per square inch, e. g. about 250 pounds per square inch. The space velocity through the reactor can be between about 5 and 15 cubic feet of carbon monoxide per hour per pound of catalyst within the reactor. A hydrogen to carbon monoxide ratio of between about 2 to 1 and 5 to 1 can be used with an optimum carbon monoxide content of between about 9 and about 15% based upon the total gas feed to the reactor. Ordinarily, the actual feed to the synthesis reactor will also include some carbon dioxide in varying proportions. Thus, the total feed can be a mixture of hydrogen, carbon monoxide and carbon dioxide in the ratio of about 2-6:1:5-2, a ratio of about 4:1:1 being preferred.

The catalyst for use in such a process should be in a finely divided form capable of being fluidized by gas flowing upwardly through the bed at low velocities to produce a turbulent suspended catalyst phase which should be maintained at an apparent bulk density within a selected critical range.

The catalyst particles can be of the order of between about 2 and 200 microns, preferably 20 to 100 microns. A satisfactory catalyst, for example, is one in which 100% passes a 40 mesh screen, a minimum of 50% passes a 200 mesh screen, and a maximum of 25% passes a 325 mesh screen. In practicing my invention, it is preferred to use as a starting material for catalyst preparation a finely divided iron oxide which will yield the desired distribution of particle sizes.

With vertical gas velocities of the order of between about 0.3 and about 5.0 feet per second, preferably between about 0.5 and 2, for example, about 1 foot per second, a liquid-like dense phase of catalyst is obtained. In such a liquid-like dense turbulent phase, the bulk density of the catalyst is between about 10 and about 80% of the density of the settled catalyst material, preferably between about 20 and about 60%, e. g. about 40%. Normally a catalyst prepared in accordance with my invention will have a settled bulk density of between about 120 and about 150 pounds per cubic foot. The vertical or linear velocity of the gas is, in any event, regulated so as to produce a turbulent suspension of catalyst within the reaction zone having an apparent density of about 45 and about 100 pounds per cubic foot.

Considerable improvement in the catalyst results when it is assured that each particle of catalyst has the optimum concentration of $K_2O$. It is known that an excessive amount of $K_2O$ results in increased production of heavy products including wax, whereas insufficient $K_2O$ favors methane formation. Therefore, if potassium fluoride or potassium carbonate is applied in solution to finely divided iron catalyst having a wide range of particle sizes, there results an excessive concentration of $K_2O$ on the fine particles and a deficiency on the large particles, giving a large proportion of particles which are either under or over promoted. This is particularly true of substantially non-porous iron oxide of the mill scale type.

The amount of promoter for the iron catalyst for CO hydrogenation can be between about 0.1 and about 2.5%, for example between about 0.25 and about 1.5%, by weight, employing an alkali or alkaline earth compound. Thus, about 2% or more potassium carbonate may be admixed with the iron catalyst before the reduction step. Ordinarily, the promoting alkali will be deposited by treating the separate size batches with a solution of the promoter compound, but if desired the promoting alkali can be deposited as a fine powder by mixing selected proportions of the promoter compound, e. g. KF and the iron powder; then igniting, preferably with agitation as in a rotary kiln. In the most usual case, however, promoter will be added in the form of a water solution of the carbonate, fluoride or other salt.

After applying the promoter, the iron oxide is subjected to reduction at an elevated temperature in the presence of hydrogen to convert it at least in part to metallic iron. The temperature of the reduction may vary over a considerable range, for example 600 to 1000° F., a preferred temperature being between about 700 and 800, for example 780° F. It appears that migration of the promoter salt into the catalyst particles takes place under these conditions.

Following the reduction, it is sometimes desirable to subject the catalyst to a high temperature stabilization treatment or "sintering" by contacting with hydrogen for a time at a temperature of between about 100 and 1400° F. By this treatment, the catalyst is rendered resistant to disintegration in use.

As an example of my process of catalyst preparation, I may grind a suitable iron oxide, for example hematite or mill scale, to a sufficient fineness to pass a 40 mesh screen. The ground iron oxide is then graded, for example by screening, levigation or other suitable means and divided into at least two fractions depending on the size or mass of the particles. It is preferred to employ screens for this purpose and separate from the ground iron oxide three or more fractions of relatively uniform particle size. For example, I may prepare fractions having particle sizes as follows:

Fraction 1—about 20 to 45 microns.
Fraction 2—about 60 to 125 microns.
Fraction 3—about 150 to 300 microns.

These catalyst fractions are then impregnated separately, applying approximately the same amount of promoter to each fraction on the weight basis. For example, I may apply the calculated amount of potassium fluoride, e. g. 1% by weight, to each lot of catalyst and then dry, preferably with agitation to obtain uniform distribution of the promoter on the catalyst particles. After drying, the desired catalyst composition is prepared by mixing the three fractions in proportion to give satisfactory fluidization when in use. It has been found that a satisfactory fluidizable catalyst results when the above fractions are combined in about the following proportions: Fraction 1, 15%; Fraction 2, 65%; and Fraction 3, 20%. After blending the different catalyst sizes in the above proportions, taking care to avoid excessive agitation which might remove the promoter salt from the surface of the catalyst particles, the compounded catalyst is subjected to the usual reduction as described hereinabove.

The nature of the promoter employed in the preparation of catalysts varies widely with the type of catalyst and the duty to be imposed on it. Thus, cracking catalysts may be composed chiefly of silica, e. g. silica gel, promoted with 2 to 25% of $Al_2O_3$, MgO or $ThO_2$. A hydroforming catalyst may be chiefly active alumina, bauxite, etc. promoted with 5 to 15% of $Cr_2O_3$ or $Mo_2O_3$. For synthesis of aldehydes from CO, olefins and $H_2$, cobalt can be promoted with about 5% $ThO_2$ and hardened with about 8% MgO. The preferred catalyst for the preparation of hydrocarbons from CO and $H_2$ by the so-called "Fischer" process hereindescribed is iron produced by reduction of $Fe_3O_4$ or other oxide and promoted with an alkali or alkaline earth metal, preferably potassium. Generally the promoter is added most conveniently in the form of a water soluble salt such as the nitrate, chloride, carbonate, hydroxide, sulfate, fluoride, phosphate, etc.

From the above description, it will be apparent to those skilled in the art that the objects of my invention have been attained. Thus, by this invention, it is possible to prepare a catalyst in a finely divided state and apply the promoter uniformly and effectively while in the finely divided form. The invention applies particularly to the preparation of catalysts of a non-porous or impervious nature which are difficult to impregnate with a promoter solution. Even somewhat porous catalysts, however, such as silica gel, are not always easily impregnated with salt solutions because of selective adsorption phenomena and surface tension effects.

Although a specific embodiment of my invention has been described, it should be understood that this is by way of illustration only, and that the invention is not limited thereto. Furthermore, in view of the description given, modifications will become apparent to those skilled in the art and such modifications and alternatives are contemplated as coming within the scope of the invention which is defined by the appended claims.

I claim:

1. The process of making a finely divided iron catalyst containing an average concentration of promoter selected from the class consisting of alkali and alkaline earth metal compounds of between about .1 and about 2.5%, which comprises the steps of classifying the finely divided iron catalyst into relatively fine and relatively coarse particles, applying a relatively dilute solution of promoter to the surface of the relatively fine catayst particles, applying a relatively strong solution of promoter to the surface of the relatively coarse catalyst particles, the concentration of solution of promoter being correlated with the weight of the iron particles in a direct proportion relationship, separately drying the two sizes of promoted catalyst, and recombining to produce a fluidizable mixture of finely divided iron catalyst having a uniform proportion of promoter in each size range based upon the weight of catalyst.

2. The method of preparing a finely divided iron catalyst suitable for use in the conversion of carbon oxides and hydrogen into hydrocarbons and oxygenated compounds which comprises the steps of classifying a mixture of finely divided iron catalyst into at least three grades, including coarse, intermediate, and fine particles, separately contacting each of the grades of catalyst with a solution of a promoter selected from the class consisting of alkali and alkaline earth metal compounds, the concentration of the solution of promoter being correlated with the weight of catalyst in the separate grades so as to apply between about .1 and about 2.5 wt. percent prompter, drying the separate grades of promoted catalyst, commingling the dry promoted catalyst to produce a mixture of finely divided iron particles having the desired fluidization characteristics, and contacting a dense turbulent suspended mass of the promoted catalyst with a reducing gas at an elevated temperature.

3. The method of preparing a finely divided iron catalyst adapted for use in the synthesis of hydrocarbons and oxygenated compounds from carbon oxides and hydrogen which comprises the steps of grading a quantity of finely divided iron catalyst into separate batches of substantially uniform particle size, applying to the individual batches of catalyst separate solutions of a promoter salt of a metal selected from the class consisting of alkali and alkaline earth metals, each solution of promoter being of a concentration which will deposit a quantity of promoter proportional to the weight of the catalyst in the respective batch treated, drying the individual batches of promoted catalyst separately, recombining the dry promoted catalyst particles to produce a mixture of finely divided particles of iron having about 15% smaller than 45 microns, about 65% between about 60 and 125 microns and about 20% between about 150 and 300 microns, and contacting the mixture of catalyst with a reducing gas at a temperature of between about 600 and 900° F. whereby the promoter migrates into the catalyst particles to produce a catalyst having a substantially uniform proportion of promoter based upon weight of iron in each catalyst particle size.

4. The method of preparing a promoted powdered catalyst having a wide range of particle sizes for easy fluidization which comprises separately applying promoter to the surface of a plurality of separate catalyst fractions of narrow particle size ranges in optimum concentration by weight for each fraction of catalyst the concentration of the promoter solution being correlated with the weight of the catalyst in the separate fractions in a direct proportion relationship, and combining said catalysts of narrow particle size range to produce a catalyst mixture having a wide range of particle sizes.

VANDERVEER VOORHEES.

REFERENCES CITED

The following references are of record in the file of this patent:

UNITED STATES PATENTS

| Number | Name | Date |
|---|---|---|
| 1,148,570 | Bosch et al. | Aug. 3, 1915 |
| 2,254,806 | Michael | Sept. 2, 1941 |
| 2,276,693 | Heath | Mar. 17, 1942 |
| 2,417,164 | Huber | Mar. 11, 1947 |